(12) United States Patent
Schoenek et al.

(10) Patent No.: US 8,556,758 B1
(45) Date of Patent: Oct. 15, 2013

(54) HYBRID POWERTRAIN

(71) Applicant: GM Global Technology Operations LLC, Detroit, MI (US)

(72) Inventors: Norman Schoenek, Novi, MI (US); Elizabeth I. Wooden, Farmington Hills, MI (US); Shawn H Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/761,424

(22) Filed: Feb. 7, 2013

(51) Int. Cl.
  *F16H 3/72* (2006.01)
  *F16H 37/06* (2006.01)
(52) U.S. Cl.
  USPC ............... 475/5; 475/219; 475/276; 475/330; 903/911; 180/65.6
(58) Field of Classification Search
  USPC ............. 475/1, 4, 5, 151, 207, 210–213, 219, 475/275, 276, 280, 284, 330; 903/910, 911; 180/65.25, 65.26, 65.6, 65.7
  See application file for complete search history.

(56) References Cited

U.S. PATENT DOCUMENTS

| | | | |
|---|---|---|---|
| 2002/0036106 A1* | 3/2002 | Hanyu et al. | 180/65.2 |
| 2008/0194369 A1* | 8/2008 | Boutou et al. | 475/5 |
| 2010/0210388 A1* | 8/2010 | Grochowski et al. | 475/5 |
| 2011/0086737 A1* | 4/2011 | Phillips | 475/5 |
| 2011/0230291 A1* | 9/2011 | Phillips | 475/5 |
| 2012/0252626 A1* | 10/2012 | Robinette | 475/284 |
| 2013/0012347 A1* | 1/2013 | Ortmann et al. | 475/5 |

* cited by examiner

*Primary Examiner* — Justin Holmes
(74) *Attorney, Agent, or Firm* — Quinn Law Group, PLLC

(57) ABSTRACT

A transmission includes a first planetary gearset and a second planetary gearset, each having a respective first planetary member, a respective second planetary member, and a respective third planetary member. The planetary members of the first planetary gearset are coaxially disposed on, and selectively rotatable about, a first axis. The planetary members of the second planetary gearset are coaxially disposed on, and selectively rotatable about, a second axis. An axis transfer mechanism including meshing gears transmits torque between the first and second planetary gearsets.

12 Claims, 4 Drawing Sheets

HYBRID POWERTRAIN

TECHNICAL FIELD

This invention relates to hybrid vehicle powertrains.

BACKGROUND

Electrically variable vehicle transmissions (EVTs) typically employ two electric motor/generators. The electric motor/generators are coaxially oriented with an input shaft connectable to an engine, an output shaft, and a plurality of planetary gearsets each having respective first, second, and third members. Each motor/generator is operatively connected to a respective member of one of the planetary gearsets to provide a range or mode of transmission operation characterized by a continuously variable speed ratio between the input shaft and the output shaft. The continuously variable speed ratio is proportional to the speed of one of the motor/generators. The motor/generators are operatively connected to an energy storage device, such as a battery, to transmit energy thereto when operating as a generator, and to receive energy therefrom when acting as a motor.

SUMMARY

According to a first aspect of the disclosure, a transmission includes an input member, an output member, a first motor/generator having a first rotor, a second motor/generator having a second rotor, a first planetary gearset, a second planetary gearset, and a third planetary gearset each having a respective first planetary member, a respective second planetary member, and a respective third planetary member.

The first, second, and third planetary members of the first planetary gearset and the first rotor are coaxially disposed on, and selectively rotatable about, a first axis. The first, second, and third planetary members of the second planetary gearset and the first, second, and third planetary members of the third planetary gearset are coaxially disposed on, and selectively rotatable about, a second axis. The second rotor is disposed on, and selectively rotatable about, a third axis. The output member is disposed on, and selectively rotatably about, a fourth axis.

The transmission further includes a first axis transfer mechanism operatively interconnecting the second planetary gearset and the first planetary gearset and is configured to transmit torque therebetween. A second axis transfer mechanism operatively interconnects the second rotor and the third planetary gearset and is configured to transmit torque therebetween. A third axis transfer mechanism operatively interconnects the first planetary gearset, the third planetary gearset, and the output member and is configured to transmit torque therebetween.

The transmission packages in tight cross car vehicle applications while minimizing parasitic losses, thereby increasing overall efficiency.

According to a second aspect of the disclosure, a transmission includes an input member, an output member, a stationary member, and a first planetary gearset and a second planetary each having a respective first planetary member, a respective second planetary member, and a respective third planetary member. The planetary members of the first planetary gearset are coaxially disposed on, and selectively rotatable about, a first axis. The planetary members of the second planetary gearset are coaxially disposed on, and selectively rotatable about, a second axis.

The transmission also includes a first motor/generator having a first rotor operatively connected to the third planetary member of the first planetary gearset for unitary rotation therewith. A second motor/generator has a second rotor that is operatively connected to the third planetary member of the second planetary gearset for unitary rotation therewith. A first axis transfer mechanism has a first axis transfer gear member, a second axis transfer gear member meshingly engaged with the first axis transfer gear member, and a third axis transfer gear member meshingly engaged with the second axis transfer gear member.

A second axis transfer mechanism is operatively connected to the first axis transfer gear member and the output member, and is configured to transmit torque from the first axis transfer gear member to the output member.

The above features and advantages and other features and advantages of the present invention are readily apparent from the following detailed description of the best modes for carrying out the invention when taken in connection with the accompanying drawings.

DETAILED DESCRIPTION

Figure 1:
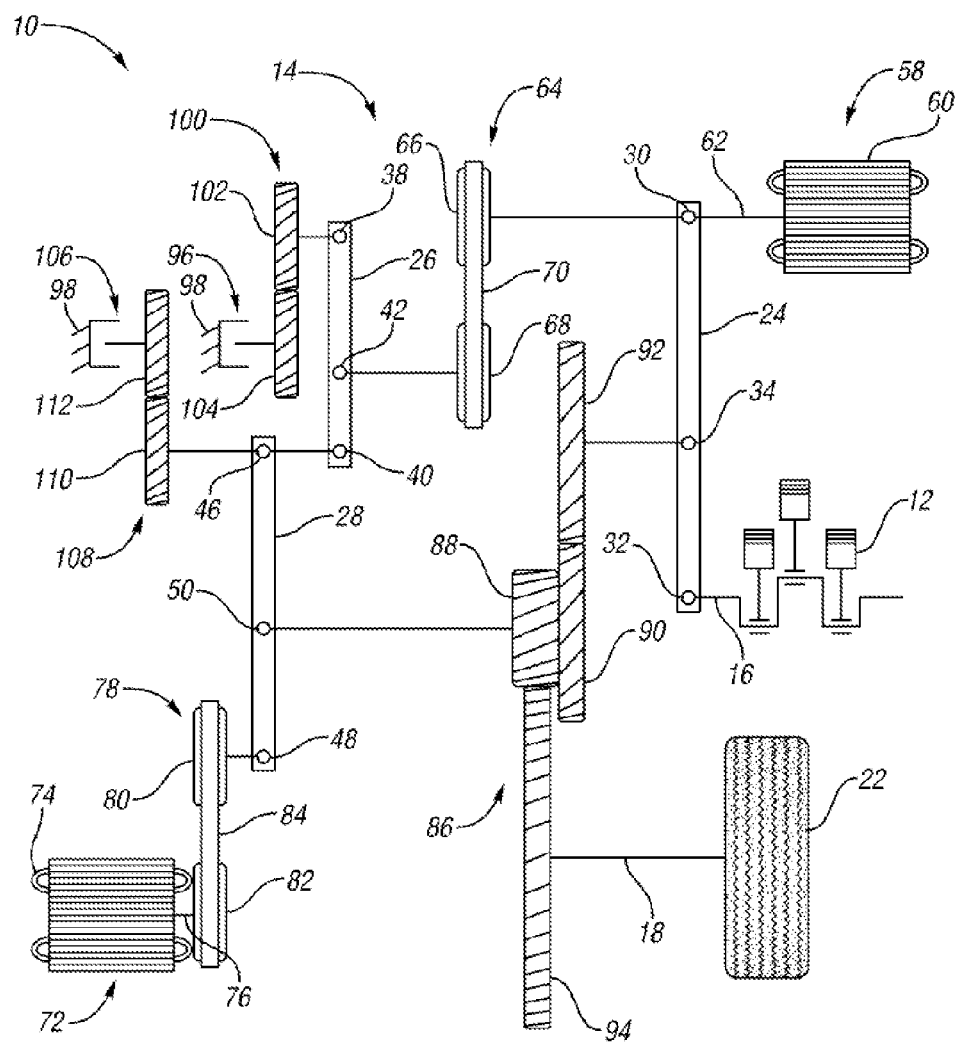
FIG. 1 is a schematic lever diagram depicting a first transmission in accordance with the claimed invention.

Referring to FIG. 1, a vehicle powertrain 10 is schematically depicted. The powertrain 10 includes an engine 12 and a transmission 14. The transmission 14 includes an input member 16 and an output member 18. The input member 16 is operatively connected to the crankshaft of the engine 12 through a powertrain damper/isolator (not shown) to receive torque therefrom. The output member 18 is operatively connected to the vehicle's drive wheels 22 to transmit torque thereto via a differential assembly (not shown). The transmission 14 also includes first, second and third planetary gearsets 24, 26, 28.

Figure 2:
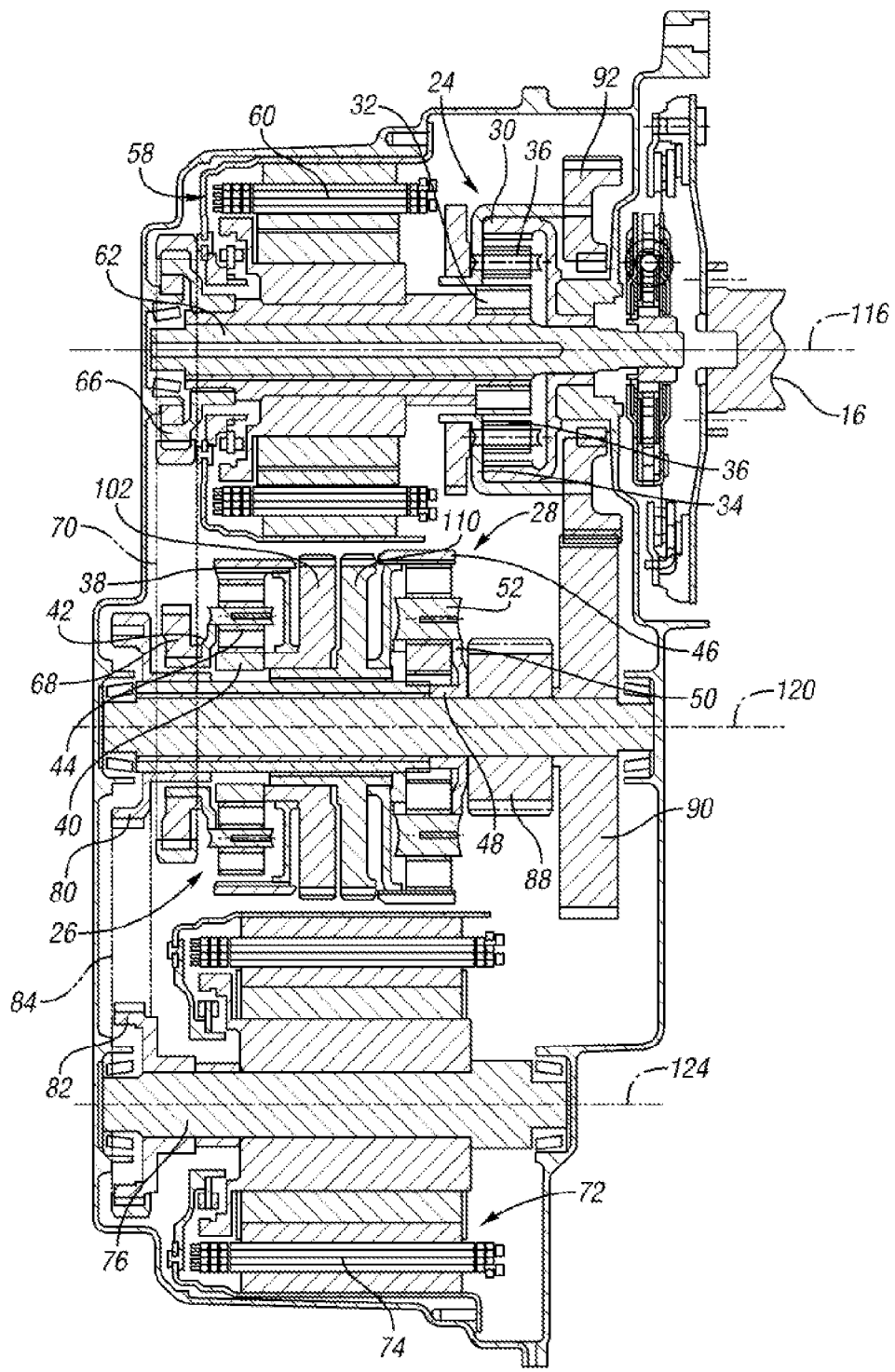
FIG. 2 is a schematic, sectional, side view of the transmission of FIG. 1 taken about a first plane.

Referring to FIGS. 1 and 2, each of the planetary gearsets 24, 26, 28 includes respective first, second, and third planetary members. In the first planetary gearset 24, the first planetary member is a ring gear member 30, the second planetary member is a sun gear member 32, and the third planetary member is a planet carrier member 34. The first planetary gearset includes at least one pinion gear 36 that is rotatably connected to the planet carrier member 34, and that is meshingly engaged with both the ring gear member 30 and the sun gear member 32.

In the second planetary gearset 26, the first planetary member is a ring gear member 38, the second planetary member is a sun gear member 40, and the third planetary member is a planet carrier member 42. The second planetary gearset includes at least one pinion gear 44 that is rotatably connected to the planet carrier member 42, and that is meshingly engaged with both the ring gear member 38 and the sun gear member 40.

In the third planetary gearset 28, the first planetary member is a ring gear member 46, the second planetary member is a sun gear member 48, and the third planetary member is a planet carrier member 50. The second planetary gearset includes at least one pinion gear 52 that is rotatably connected to the planet carrier member 50, and that is meshingly engaged with both the ring gear member 46 and the sun gear member 48. It should be noted that, where used in the claims, first, second, and third members of planetary gearsets do not necessarily refer to a member of a particular type; thus, for example, a first member may be any one of a ring gear member, sun gear member, or planet carrier assembly. Similarly, as used in the claims, the respective first, second, or third members of two or more gearsets may or may not be the same type of member.

The input member 16 is operatively connected to sun gear member 32 for unitary rotation therewith. Accordingly, the sun gear member 32 is operatively connected to the input member 16 to receive torque therefrom. A first motor/generator 58 includes a stator 60 and a first rotor 62. The stator 60 is connected to a stationary member, such as the transmission housing 98. The ring gear 30 is operatively connected to the first rotor 62 to receive torque therefrom. More specifically, in the embodiment of FIG. 1, ring gear 30 is operatively connected to the first rotor 62 for unitary rotation therewith.

A first axis transfer mechanism, which, in the embodiment depicted, is a first chain drive 64, operatively interconnects the second planetary gearset 26 and the first planetary gearset 24 and is configured to transmit torque therebetween. More specifically, the ring gear member 30 of the first planetary gearset 24 is operatively connected to the planet carrier member 42 of the second planetary gearset 26 via the first chain drive 64 such that the first chain drive 64 transmits torque between the ring gear member 30 and the planet carrier member 42.

The first chain drive 64 includes a first sprocket 66 operatively connected to ring gear member 30, and, correspondingly, to the first rotor 62, for unitary rotation therewith. The first chain drive 64 also includes a second sprocket 68 operatively connected to planet carrier member 42 for unitary rotation therewith. A first roller chain 70 engages both the first and second sprockets 66, 68 to transfer motion therebetween.

A second motor/generator 72 includes a stator 74 and a second rotor 76. A second axis transfer mechanism, which is a second chain drive 78 in the embodiment depicted, operatively interconnects the second rotor 76 and the third planetary gearset 28 and is configured to transmit torque therebetween. More specifically, in the embodiment depicted, the sun gear member 48 of the third planetary gearset 28 is operatively connected to the second rotor 76 to receive torque therefrom via the second axis transfer mechanism.

The second chain drive 78 includes a third sprocket 80 operatively connected to sun gear member 48 for unitary rotation therewith. The chain drive 78 also includes a fourth sprocket 82 operatively connected to rotor 76 for unitary rotation therewith. A second roller chain 84 interconnects and engages both the third and fourth sprockets 80, 82 to transfer motion therebetween. The stator 74 is connected to a stationary member, such as the transmission housing 98.

A third axis transfer mechanism 86 operatively interconnects the first planetary gearset 24, the third planetary gearset 28, and the output member 18 and is configured to transmit torque therebetween. In the embodiment depicted, the third axis transfer mechanism 86 has a first axis transfer gear member 88, a second axis transfer gear member 90, a third axis transfer gear member 92, and a fourth axis transfer gear 94.

The first axis transfer gear member 88 and the second axis transfer gear member 90 are operatively connected to the planet carrier member 50 of the third planetary gearset 28 for unitary rotation therewith (and thus gear member 88 and gear member 90 are rigidly interconnected for unitary rotation with each other). The third axis transfer gear member 92 is meshingly engaged with the second axis transfer gear member 90 and is operatively connected to the planet carrier member 34 of the first planetary gearset 24 for unitary rotation therewith. The fourth axis transfer gear member 94 is meshingly engaged with the first axis transfer gear member 88 and is operatively connected to the output member 18 for unitary rotation therewith.

Thus, planet carrier member 50 is operatively connected to the output member 18 to transmit torque thereto via the axis transfer mechanism 86. Planet carrier 34 is also operatively connected to the output member 18 to transmit torque thereto via the axis transfer mechanism 86. Torque may be transmitted from planet carrier member 34 to the output member 18 via gear members 92, 90, 88, and 94. Torque may also be transmitted from planet carrier member 50 to the output member 18 via gear members 88 and 94.

Figure 3:
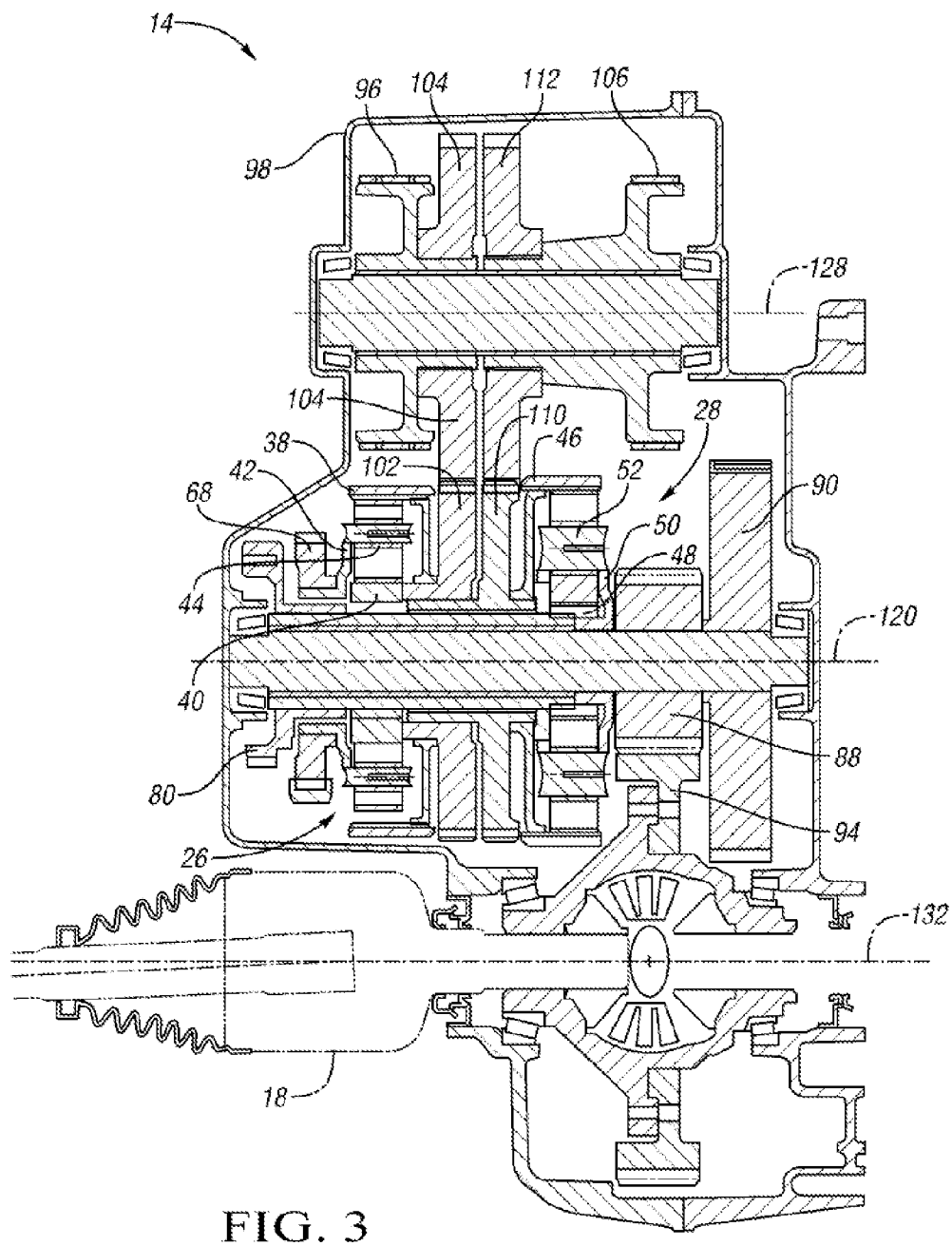
FIG. 3 is a schematic, sectional, side view of the transmission of FIGS. 1 and 2 taken about a second plane.

Referring to FIGS. 1 and 3, the transmission 14 includes a first torque transmitting mechanism, namely, a first brake 96, which is operatively connected to the ring gear member 38 of the second planetary gearset 26 and the stationary member 98. The first brake 96 is selectively engageable to couple the ring gear member 38 of the second planetary gearset 26 to the stationary member 98; that is, the first brake 96 is configured to selectively couple ring gear member 38 to the stationary member 98 to prevent the rotation of the ring gear member 38 relative to the housing 98.

The first brake 96 is positioned about a different axis of rotation from ring gear member 38. A fourth axis transfer mechanism 100 has a fifth axis transfer gear member 102 operatively connected to the ring gear member 38 of the second planetary gearset 26 for unitary rotation therewith, and a sixth axis transfer gear member 104 meshingly engaged with the fifth axis transfer gear member 102 and operatively connected to the first brake 96.

When the brake 96 is engaged, the brake 96 couples gear member 104 to the housing 98, thereby preventing the rotation of the gear member 104 relative to the housing 98. When gear member 104 is coupled to the housing 98, rotation of gear member 102 and ring gear member 38 is also prevented. When the brake 96 is disengaged, the gear member 104 can rotate freely with respect to the housing 98, and thus ring gear member 38 and gear member 102 can also rotate freely when the brake 96 is disengaged.

Ring gear member 46 of the third planetary gearset 28 is operatively connected to the sun gear member 40 of the second planetary gearset 26 for unitary rotation together. The transmission 14 includes a second torque transmitting mechanism, namely, a second brake 106, which is configured to selectively couple ring gear member 46 and the sun gear member 40 to the transmission housing 98 to prevent the rotation of the ring gear member 46 and the sun gear member 40.

The second brake 106 is positioned about a different axis of rotation from ring gear member 46 and sun gear member 40. A fifth axis transfer mechanism 108 has a seventh axis transfer gear member 110 operatively connected to the ring gear member 46 of the third planetary gearset 28 for unitary rotation therewith, and an eighth axis transfer gear member 112 meshingly engaged with the seventh axis transfer gear member 110. The eighth axis transfer gear member 112 is operatively connected to the second brake 106.

When the brake 106 is engaged, the brake 106 couples gear member 112 to the housing 98, thereby preventing the rotation of the gear member 112 relative to the housing 98. When gear member 112 is coupled to the housing 98, rotation of gear member 110, ring gear member 46, and sun gear member 40 is also prevented. When the brake 106 is disengaged, the gear member 112 can rotate freely with respect to the housing 98, and thus ring gear member 46, sun gear member 40, and gear member 110 can also rotate freely when the brake 106 is disengaged.

Referring specifically to FIGS. 2 and 3, the input member 16; the first, second, and third planetary members of the first planetary gearset 24 (i.e., ring gear member 30, planet carrier member 34, and sun gear member 32); gear member 92; rotor 62; and sprocket 66 are coaxially disposed, and selectively rotatable, about a first axis 116. The first, second, and third members of the second planetary gearset 26 (i.e., ring gear member 38, sun gear member 40, planet carrier member 42); the first, second, and third members of the third planetary gearset 28 (i.e., ring gear member 46, sun gear member 48, planet carrier member 50); gear members 88, 90, 102, 110, and sprockets 68, 80 are coaxially disposed, and selectively rotatable, about a second axis 120. The second rotor 76 and sprocket 82 are coaxially disposed, and selectively rotatable, about a third axis 124. Output member 18 and gear member 94 are coaxially disposed, and selectively rotatable, about a fourth axis 132. Gear members 104, 112 and brakes 96, 106 are coaxially disposed, and selectively rotatable, about a fifth axis 128.

Figure 4:
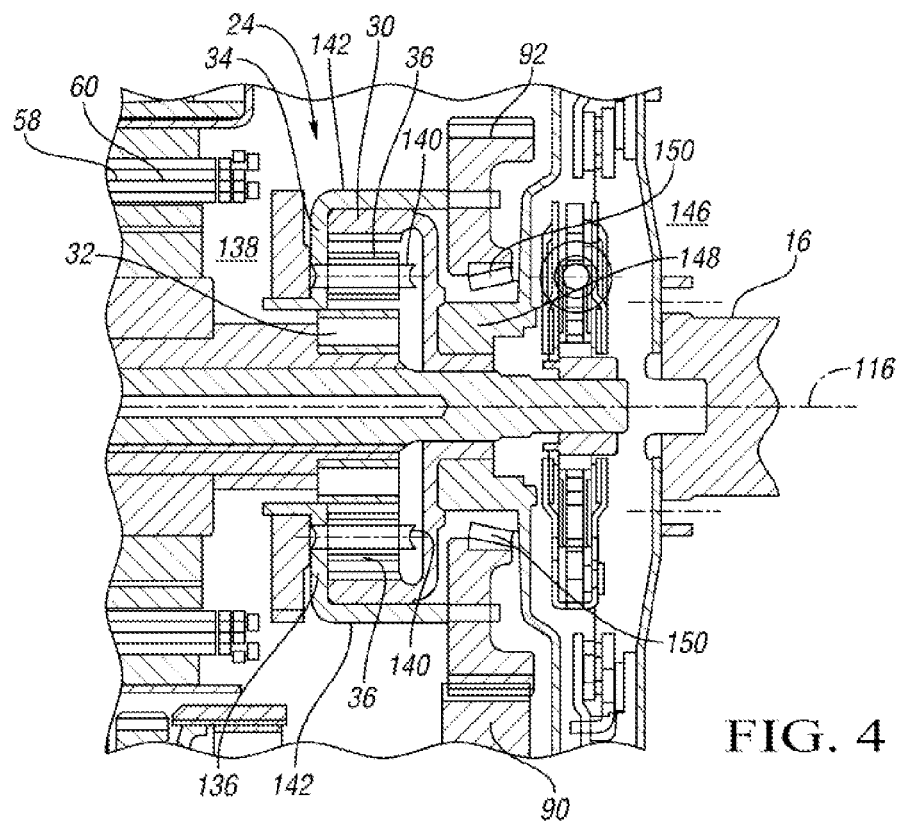
FIG. 4 is a schematic, sectional, side view of a portion of the transmission of FIGS. 1-3.

Referring to FIG. 4, a first portion 136 of the planet carrier member 34 of the first planetary gearset 24 is disposed on a first side 138 of the ring gear member 30. The pinion gears 36 are connected to shafts 140; shafts 140 are connected to the first portion 136 of the planet carrier member 34. A second portion 142 of the planet carrier member 34 extends axially from the first side 138 of the ring gear member 30 to a second side 146 of the ring gear member 30. The second portion 142 is disposed radially outward relative to the ring gear member 30. The second portion 142 is operatively connected to the third axis transfer gear member 92, which is disposed on the second side 146 of the ring gear member 30.

The third axis transfer gear member 92 rotates about grounded structure 148, i.e., structure that is part of, or rigidly connected to, the housing 98. A tapered bearing 150 is disposed between the structure 148 and gear member 92 to axially retain the planet carrier member 34 and the gear member 92.

The transmission 14 provides compact, flat vehicle packaging. Efficiency advantages may be provided by geared low loss band clutches, i.e., brakes 96, 106 (no high pressure/high flow pump). Chain drives 64, 78 provide low loss axis transfers. The speed of the second motor/generator 72 may be reduced using off-axis ratio (30% torque/size reduction). The architecture of the transmission 14 is motor length flexible, which enables the use of induction motors.

Figure 5:
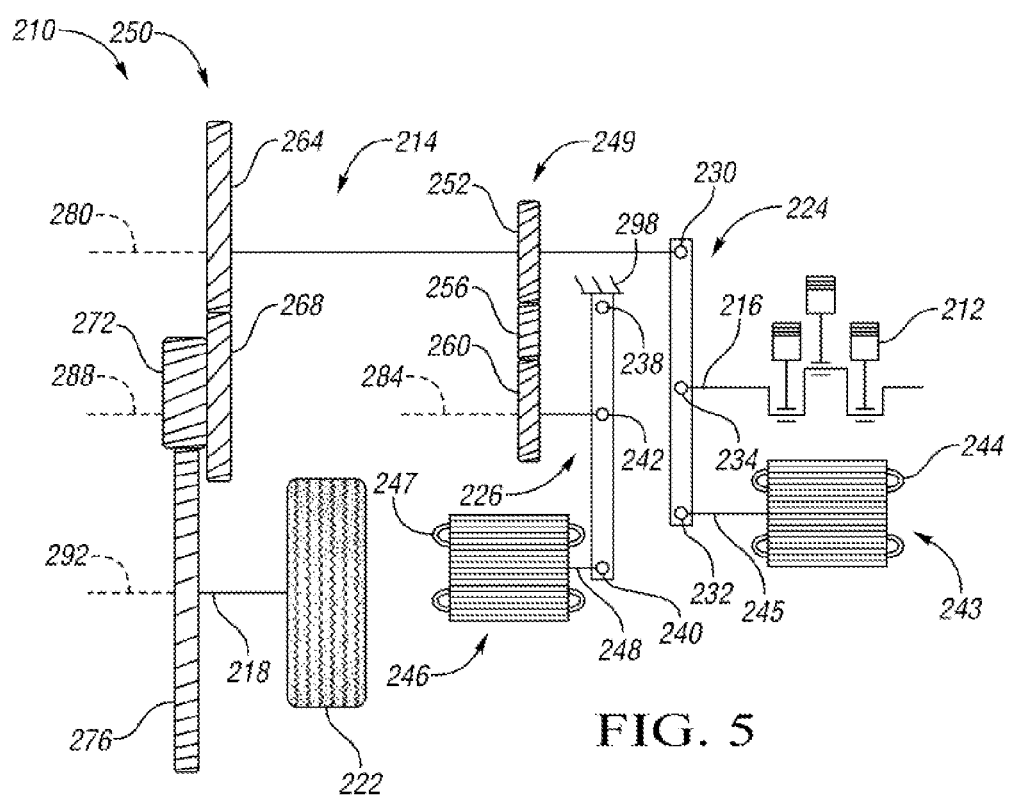
FIG. 5 is a schematic lever diagram depicting a second transmission in accordance with the claimed invention.

Referring to FIG. 5, another powertrain 210 in accordance with the claimed invention is schematically depicted. The powertrain 210 includes an engine 212 and a transmission 214. The transmission 214 includes an input member 216 and an output member 218. The input member 216 is operatively connected to the crankshaft of the engine 212 through a powertrain damper/isolator (not shown) to receive torque therefrom. The output member 218 is operatively connected to the vehicle's drive wheels 222 to transmit torque thereto via a differential assembly (not shown). The transmission 214 also includes first and second planetary gearsets 224, 226.

Each of the planetary gearsets 224, 226 includes respective first, second, and third planetary members. In the first planetary gearset 224, the first planetary member is a ring gear member 230, the second planetary member is a sun gear member 232, and the third planetary member is a planet carrier member 234. The first planetary gearset includes at least one pinion gear (such as the one shown at 36 in FIGS. 2 and 4) that is rotatably connected to the planet carrier member 234, and that is meshingly engaged with both the ring gear member 230 and the sun gear member 232.

In the second planetary gearset 226, the first planetary member is a ring gear member 238, the second planetary member is a sun gear member 240, and the third planetary member is a planet carrier member 242. The second planetary gearset 226 includes at least one pinion gear (such as the one shown at 44 in FIG. 2) that is rotatably connected to the planet carrier member 242, and that is meshingly engaged with both the ring gear member 238 and the sun gear member 240.

A first motor/generator 243 includes a stator 244 and a first rotor 245. The stator 244 is connected to a stationary member, such as the transmission housing 298. A second motor/generator 246 includes a stator 247 and a second rotor 248. The stator 247 is connected to a stationary member, such as the transmission housing 298.

The sun gear member 232 is operatively connected to the first rotor 245 for unitary rotation therewith. The planet carrier member 234 is operatively connected to the input member 216 for unitary rotation therewith. Sun gear member 240 is operatively connected to the second rotor 248 for unitary rotation therewith. Ring gear member 238 is operatively connected to the housing 298 such that the ring gear member 238 is stationary.

The transmission 214 includes at least one axis transfer mechanism that operatively interconnects one of the planetary members of the first planetary gearset 224, one of the members of the second planetary gearset 226, and the output member 218. The at least one axis transfer mechanism is configured such that torque is transmissible from the first planetary gearset 224 and from the second planetary gearset 226 to the output member 218 through the at least one axis transfer mechanism. In the embodiment depicted, two axis transfer mechanisms 249, 250 cooperate to interconnect the first planetary gearset 224, the second planetary gearset 226, and the output member 218 such that torque is transmissible therebetween.

More specifically, a first axis transfer mechanism 249 includes a first axis transfer gear member 252, a second axis transfer gear member 256 meshingly engaged with the first axis transfer gear member 252, and a third axis transfer gear member 260 meshingly engaged with the second axis transfer gear member 256. Thus, the second axis transfer gear member 256 acts as an idler gear. A second axis transfer mechanism 250 includes a fourth axis transfer gear member 264 operatively connected to the first axis transfer gear member 252 for unitary rotation therewith, a fifth axis transfer gear member 268 meshingly engaged with the fourth axis transfer gear member 264, a sixth axis transfer gear member 272 operatively connected to the fifth axis transfer gear member 268 for unitary rotation therewith, and a seventh axis transfer gear member 276 meshingly engaged with the sixth axis transfer gear member 272 and operatively connected to the output member 218 for unitary rotation therewith. The first and fourth axis transfer gear members 252, 264 are operatively interconnected for unitary rotation.

The first, second, and third planetary members 230, 232, 234 of the first planetary gearset 224, the input member 216, the first rotor 245, the first axis transfer gear member 252, and the fourth axis transfer gear member 264 are coaxially disposed on, and selectively rotatable about, a first axis 280. The first, second, and third members 238, 240, 242 of the second planetary gearset 226, the second rotor 248, and the third axis transfer gear member 260 are coaxially disposed on, and selectively rotatable about, a second axis 284. The output member 218 is coaxially disposed on, and selectively rotatable about, a third axis 292. The fifth and sixth axis transfer gear members 268, 272 are coaxially disposed on, and selectively rotatable about, a fourth axis 288.

Ring gear member 230 is operatively connected to the first axis transfer gear 252 for unitary rotation therewith. Ring gear member 230 is also operatively connected to the fourth axis transfer gear member 264 for unitary rotation therewith, since the first and fourth axis transfer gears 252, 264 are interconnected for unitary rotation. Planet carrier member 242 is operatively connected to the third axis transfer gear member 260 for unitary rotation.

The transmission 214 of FIG. 5 is a reduced content, off-axis, two mode electrically variable transmission. The transmission 214 is characterized by on-axis input split with mechanical point at an overdrive ratio, and an additional planetary gearset to reduce the torque requirements of the second motor/generator 246. The axis transfer mechanism 249 reduces on-axis transmission length and provides additional motor/generator 246 ratio.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member;
a first motor/generator having a first rotor;
a second motor/generator having a second rotor;
a first planetary gearset, a second planetary gearset, and a third planetary gearset each having a respective first planetary member, a respective second planetary member, and a respective third planetary member;
said first, second, and third planetary members of the first planetary gearset, said input member, and said first rotor being coaxially disposed on, and selectively rotatable about, a first axis;
said first, second, and third planetary members of the second planetary gearset and said first, second, and third planetary members of the third planetary gearset being coaxially disposed on, and selectively rotatable about, a second axis;
said second rotor being disposed on, and selectively rotatable about, a third axis;
said output member being disposed on, and selectively rotatably about, a fourth axis;
a first axis transfer mechanism operatively interconnecting the second planetary gearset and the first planetary gearset and configured to transmit torque therebetween;
a second axis transfer mechanism operatively interconnecting the second rotor and the third planetary gearset and configured to transmit torque therebetween; and
a third axis transfer mechanism operatively interconnecting the first planetary gearset, the third planetary gearset, and the output member and configured to transmit torque therebetween.

2. The transmission of claim 1, wherein the first planetary member of the first planetary gearset is operatively connected to the first axis transfer mechanism and to the first rotor for unitary rotation therewith;
wherein the second planetary member of the first planetary gearset is operatively connected to the input member for unitary rotation therewith;
wherein the third planetary member of the first planetary gearset is operatively connected to the third axis transfer mechanism;
wherein the second planetary member of the second planetary gearset is operatively connected to the first planetary member of the third planetary gearset for unitary rotation therewith;
wherein the third planetary member of the second planetary gearset is operatively connected to the first axis transfer mechanism;
wherein the second planetary member of the third planetary gearset is operatively connected to the second axis transfer mechanism; and
wherein the third planetary member of the third planetary gearset is operatively connected to the third axis transfer mechanism.

3. The transmission of claim 2, wherein the first axis transfer mechanism is a first chain drive having a first sprocket operatively connected to the first member of the first planetary gearset for unitary rotation therewith, a second sprocket operatively connected to the third member of the second planetary gearset for unitary rotation therewith, and a first roller chain operatively engaging and interconnecting the first and second sprockets; and
wherein the second axis transfer mechanism is a second chain drive having a third sprocket operatively connected to the second member of the third planetary gearset for unitary rotation therewith, a fourth sprocket operatively connected to the second rotor for unitary rotation therewith, and a second roller chain operatively engaging and interconnecting the third and fourth sprockets.

4. The transmission of claim 3, wherein the third axis transfer mechanism includes first, second, third, and fourth axis transfer gear members;
wherein the first axis transfer gear member is operatively connected to the third planetary member of the third planetary gearset for unitary rotation therewith;
wherein the second axis transfer gear member is operatively connected to the first axis transfer gear member for unitary rotation therewith;
wherein the third axis transfer gear member is meshingly engaged with the second axis transfer gear member and operatively connected to the third member of the first planetary gearset for unitary rotation therewith; and
wherein the fourth axis transfer gear member is meshingly engaged with the first axis transfer gear member and operatively connected to the output member for unitary rotation therewith.

5. The transmission of claim 4, further comprising a stationary member;
a first brake operatively connected to the first member of the second planetary gearset and the stationary member, and being selectively engageable to couple the first member of the second planetary gearset to the stationary member; and
a second brake operatively connected to the first member of the third planetary gearset and the stationary member, and being selectively engageable to couple the first member of the third planetary gearset to the stationary member.

6. The transmission of claim 5, wherein the first brake and the second brake are coaxially disposed on a fifth axis.

7. The transmission of claim 6, further comprising a fourth axis transfer mechanism having a fifth axis transfer gear member operatively connected to the first member of the second planetary gearset for unitary rotation therewith, and a sixth axis transfer gear member meshingly engaged with the fifth axis transfer gear member and operatively connected to the first brake; and a fifth axis transfer mechanism having a seventh axis transfer gear member operatively connected to the first member of the third planetary gearset for unitary rotation therewith, and an eighth axis transfer gear member meshingly engaged with the seventh axis transfer gear member and operatively connected to the second brake.

8. The transmission of claim 2, wherein the third planetary member of the first planetary gearset is a planet carrier member;

wherein one of the first and second members of the first planetary gearset is a ring gear member;

wherein a portion of the planet carrier member extends axially from one side of the ring gear member to the other side of the ring gear member; and wherein the portion of the planet carrier member is disposed radially outwardly from the ring gear member.

9. The transmission of claim 2, wherein the first planetary member of the first planetary gearset is a ring gear member;

wherein the second planetary member of the first planetary gearset is a sun gear member;

wherein the third planetary member of the first planetary gearset is a planet carrier member;

wherein the first planetary member of the second planetary gearset is a ring gear member;

wherein the second planetary member of the second planetary gearset is a sun gear member;

wherein the third planetary member of the second planetary gearset is a planet carrier member;

wherein the first planetary member of the third planetary gearset is a ring gear member;

wherein the second planetary member of the third planetary gearset is a sun gear member; and wherein the third planetary member of the third planetary gearset is a planet carrier member.

10. A transmission comprising:

an output member;

a first planetary gearset and a second planetary each having a respective first planetary member, a respective second planetary member, and a respective third planetary member;

said planetary members of the first planetary gearset being coaxially disposed on, and selectively rotatable about, a first axis;

said planetary members of the second planetary gearset being coaxially disposed on, and selectively rotatable about, a second axis;

said output member being selectively rotatable about a third axis;

at least one axis transfer mechanism operatively interconnecting one of the planetary members of the first planetary gearset, one of the members of the second planetary gearset, and the output member;

wherein said at least one axis transfer mechanism is configured such that torque is transmissible from the first planetary gearset and from the second planetary gearset to the output member through said at least one axis transfer mechanism;

wherein said at least one axis transfer mechanism includes a first axis transfer mechanism and a second axis transfer mechanism;

wherein the first axis transfer mechanism includes a first axis transfer gear member, a second axis transfer gear member meshingly engaged with the first axis transfer gear member, and a third axis transfer gear member meshingly engaged with the second axis transfer gear member;

wherein the second axis transfer mechanism includes a fourth axis transfer gear member operatively connected to the first axis transfer gear member for unitary rotation therewith, a fifth axis transfer gear member meshingly engaged with the fourth axis transfer gear member, a sixth axis transfer gear member operatively connected to the fifth axis transfer gear member for unitary rotation therewith, and a seventh axis transfer gear member meshingly engaged with the sixth axis transfer gear member and operatively connected to the output member for unitary rotation therewith.

11. The transmission of claim 10, further comprising an input member;

a stationary member;

a first motor/generator having a first rotor;

a second motor/generator having a second rotor;

wherein the first member of the first planetary gearset is operatively connected to the first axis transfer gear member for unitary rotation therewith;

wherein the second member of the first planetary gearset is operatively connected to the first rotor for unitary rotation therewith;

wherein the third member of the first planetary gearset is operatively connected to the input member for unitary rotation therewith;

wherein the first member of the second planetary gearset is operatively connected to the stationary member such that the first member of the second planetary gearset is not rotatable with respect to the stationary member;

wherein the second member of the second planetary gearset is operatively connected to the second rotor for unitary rotation therewith; and wherein the third member of the second planetary gearset is operatively connected to the third axis transfer gear member for unitary rotation therewith.

12. The transmission of claim 11, wherein the first planetary member of the first planetary gearset is a ring gear member;

wherein the second planetary member of the first planetary gearset is a sun gear member;

wherein the third planetary member of the first planetary gearset is a planet carrier member;

wherein the first planetary member of the second planetary gearset is a ring gear member;

wherein the second planetary member of the second planetary gearset is a sun gear member; and wherein the third planetary member of the second planetary gearset is a planet carrier member.

* * * * *